(12) United States Patent
Combs

(10) Patent No.: US 6,571,945 B1
(45) Date of Patent: Jun. 3, 2003

(54) VINYL CD-ROM HOLDER

(75) Inventor: Jeff Combs, Greenwood, IN (US)

(73) Assignee: Discom Technologies, LLC, Greenwood, IN (US)

( * ) Notice: Subject to any disclaimer, the term of this patent is extended or adjusted under 35 U.S.C. 154(b) by 0 days.

(21) Appl. No.: 10/074,171

(22) Filed: Feb. 12, 2002

(51) Int. Cl.$^7$ .............................................. B65D 85/57
(52) U.S. Cl. .................. 206/308.1; 206/312; 206/459.5
(58) Field of Search ...................... 206/308.1, 309–312, 206/232, 459.5; 229/71, 307, 313, 314, 316

(56) References Cited

U.S. PATENT DOCUMENTS

| | | | |
|---|---|---|---|
| 5,690,220 A | * 11/1997 | Swan | 206/308.1 |
| 5,713,605 A | * 2/1998 | Pace et al. | 206/308.1 |
| 6,250,462 B1 | * 6/2001 | Kato | 206/312 |
| 6,349,823 B1 | * 2/2002 | Innis | 206/308.1 |
| 6,446,417 B1 | * 9/2002 | Lux et al. | 206/308.1 |

\* cited by examiner

*Primary Examiner*—Luan K. Bui
(74) *Attorney, Agent, or Firm*—Woodard, Emhardt, Moriarty, McNett & Henry LLP

(57) ABSTRACT

The present invention relates to a CD-ROM holder which is formed from two sheets of heat-fusable material, such as vinyl. The CD-ROM and a backer card, which is preferably a substantially square sheet of cardboard with a width and height substantially equal to the diameter of the CD-ROM, are placed between the two sheets of vinyl and these sheets are thermally fused on all four edges in order to completely contain the CD-ROM and backer card. A perforated double tearline is preferably provided along one edge of one of the sheets of vinyl in order to provide an easily opened channel through which the CD-ROM may be accessed. Furthermore, at least one of the vinyl sheets preferably includes indicia and/or graphic markings thereon in order to provide a message to the recipient of the CD-ROM holder. Additional indicia and/or graphics may be printed onto one or both sides of the backer card. One side of the backer card opposite the CD-ROM is preferably completely visible through the clear vinyl side opposite the CD-ROM.

1 Claim, 3 Drawing Sheets

VINYL CD-ROM HOLDER

TECHNICAL FIELD OF THE INVENTION

The present invention generally relates to computer storage media and, more particularly, to a vinyl CD-ROM holder.

BACKGROUND OF THE INVENTION

It has become increasingly common to transfer data from one party to another by means of a CD-ROM (compact disc-read only memory). The CD-ROM contains computer software and/or data which may be utilized with a computer. For example, the CD-ROM may contain software and data which enables the user's computer to access an Internet service provider. In order to expose as many potential customers as possible to their software product, such a software provider would like to mail the CD-ROMs to a great many potential customers.

Although CD-ROMs are tremendously more physically and electronically robust than prior forms of computer storage media, they are still relatively fragile in the context of automatic mail handling equipment which would be used to process the mailed CD-ROMs. There is therefore a need for a CD-ROM container which will provide the necessary protection to the CD-ROM as it travels through the mails. Ideally, such a CD-ROM holder would be lightweight (to reduce postage cost), inexpensive and non-bulky. The present invention is directed toward a CD-ROM holder which meets these needs.

SUMMARY OF THE INVENTION

The present invention relates to a CD-ROM holder which is formed from two sheets of heat-fusable material, such as vinyl. The CD-ROM and a backer card, which is preferably a substantially square sheet of cardboard with a width and height substantially equal to the diameter of the CD-ROM, are placed between the two sheets of vinyl and these sheets are thermally fused on all four edges in order to completely contain the CD-ROM and backer card. A perforated double tearline is preferably provided along one edge of one of the sheets of vinyl in order to provide an easily opened channel through which the CD-ROM may be accessed. Furthermore, at least one of the vinyl sheets preferably includes indicia and/or graphic markings thereon in order to provide a message to the recipient of the CD-ROM holder. Additional indicia and/or graphics may be printed onto one or both sides of the backer card. One side of the backer card opposite the CD-ROM is preferably completely visible through the clear vinyl side opposite the CD-ROM.

DETAILED DESCRIPTION OF THE PREFERRED EMBODIMENTS

Figure 1:
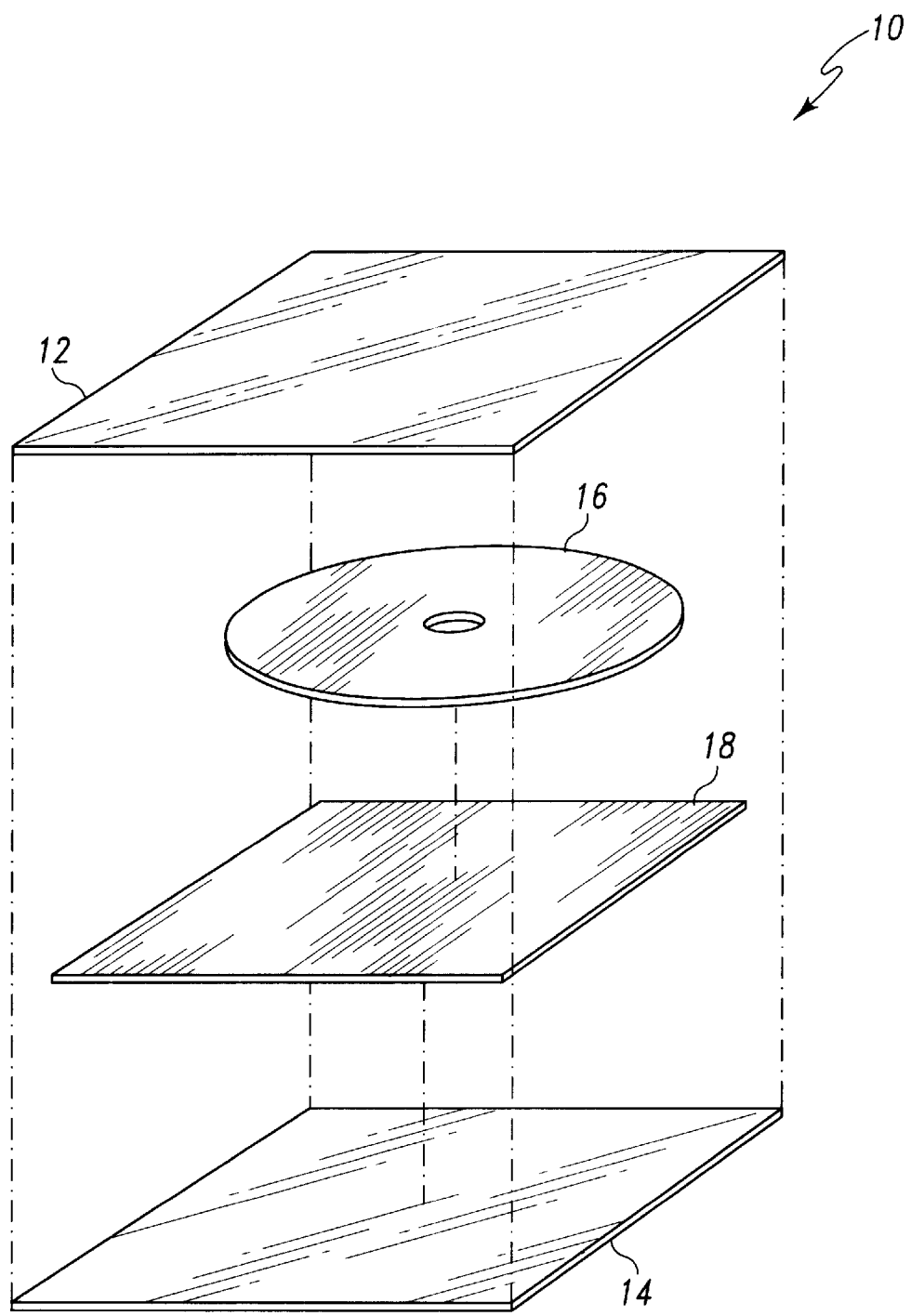
FIG. 1 is an exploded perspective view of a first embodiment CD-ROM holder and CD-ROM of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

Referring now to FIG. 1, there is illustrated an exploded perspective view of a first embodiment CD-ROM holder of the present invention, indicated generally at 10. The CD-ROM holder 10 is formed from two overlying sheets of vinyl or other material which may be heat-sealed. In a preferred embodiment, the CD-ROM holder 10 is formed from two sheets of 12 gauge (0.012 inch) frosty clear vinyl having a matte finish on one side. The CD-ROM holder 10 uses a top sheet of vinyl 12 and a bottom sheet of vinyl 14, between which is placed a CD-ROM 16 and a backer card 18. The backer card 18 is preferably of a substantially square configuration with rounded corners, and having a width and height substantially equal to the diameter of the CD-ROM 16. The backer card 18 is preferably formed from cardboard or other reasonably stiff material (for example, plastic) suitable for protecting the CD-ROM 16 from damage when the CD-ROM holder 10 is sent through the mails. The components 12–18 are placed in the orientation illustrated in FIG. 1 and the top sheet 12 is fused to the bottom sheet 14 along the entire periphery thereof by means of a heated die, as is known in the art. In a preferred embodiment, the CD-ROM holders 10 are manufactured several at a time from two sheets of vinyl which are larger than the area required for the top sheet 12 and bottom sheet 14. By arranging several backer boards 18 and CD-ROMs 16 between the larger sheets, several CD-ROM holders 10 may be heat sealed at the same time using a die having heat sealing bars arranged in the appropriate pattern. After heat sealing, the individual CD-ROM holders 10 may be separated from one another using a cutting die that removes adjacent CD-ROM holders 10 by cutting along the heat seal joining the two dies. The sealing and cutting of multiple items from larger vinyl stock is well known in the art.

Figure 2:
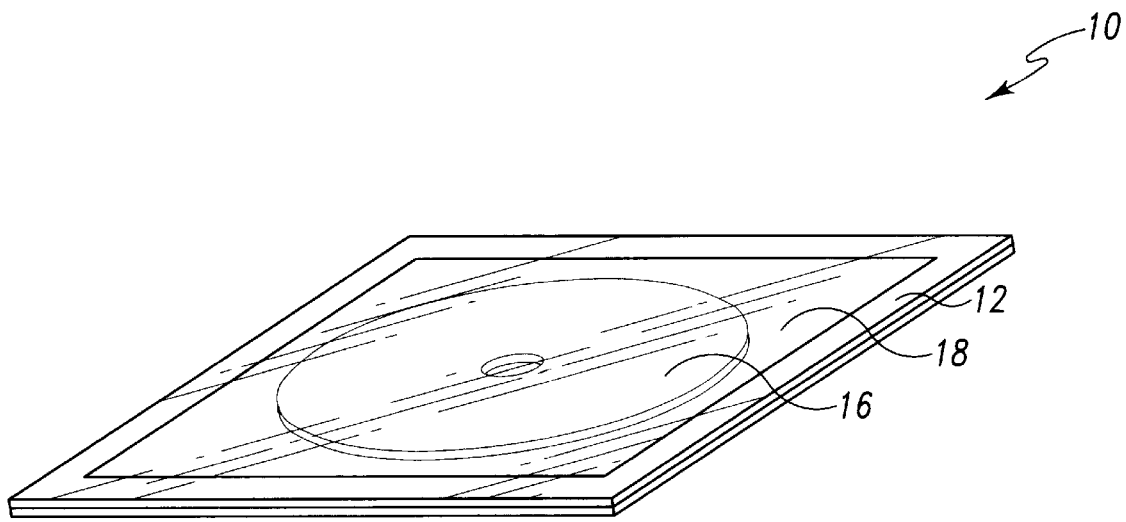
FIG. 2 is a perspective view of the first embodiment to the present invention.
Figure 3:
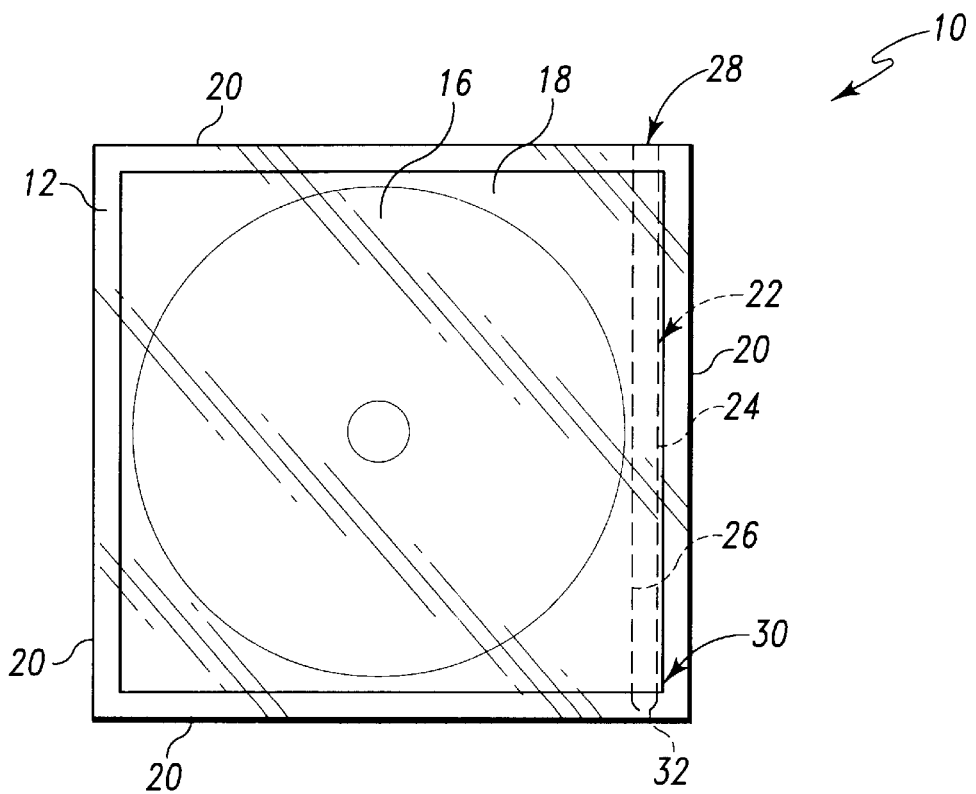
FIG. 3 is a top plan view of the first embodiment of the present invention.

The completed CD-ROM holder 10 is illustrated in FIGS. 2 and 3. The CD-ROM holder 10 includes edge seals 20 which substantially completely surround a perimeter of the CD-ROM holder 10. The seals on the two sheets of vinyl are preferably formed by a heated die, such as a die which utilizes radio frequency (RF) heating. The seals 20 thereby form an enclosed pocket which contains the CD-ROM 16 and the backer card 18. The presence of the backer card 18 inside the CD-ROM holder 10 provides stiffness which prevents flexing of the CD-ROM 16 during handling which could crack, break or otherwise damage the CD-ROM 16 when transported through the mail.

The heat seals 20 which encapsulate the CD-ROM 16 are generally as strong as the vinyl material itself, which makes the CD-ROM holder 10 extremely resistant to tearing. Because of this, access to the CD-ROM 16 after sealing the CD-ROM holder 10 is difficult without the use of sharp instruments. In order to alleviate this problem, the preferred embodiment CD-ROM holder 10 includes an integral zipper 22 formed into the top sheet 12. The integral zipper 22 is formed by placing adjacent perforated lines 24 and 26 into the top sheet 12. The perforated lines 24, 26 preferably extend from the seal 20 at a first end 28 to a second end 30 which is spaced a short distance from the opposite end of the CD-ROM holder 10. The perforated lines 24, 26 are joined at the end 30 by a semi-circular perforation 32. By joining the perforated lines 24, 26 with the semi-circular perforation 32, a pull strip is created, whereby the end 32 may be grasped by the user and pulled away from the top sheet 12. This will cause the perforated lines 24, 26 to tear, opening a gap in the top sheet 12 across substantially the entire width of the CD-ROM holder 10. Access to the CD-ROM 16 may then be had through this opening.

CD-ROMS 16 are typically imprinted with identifying indicia thereon specifying the title of the software and/or data contained therein, as well as other markings which may indicate the source of the CD-ROM 16. Because of this, prior art CD-ROM holders are manufactured from clear materials which allow the user to see through the holder to view the surface of the CD-ROM 16. The present invention recognizes that it may in some cases be desirable to obscure all or part of the user's view of the CD-ROM 16 while it is placed inside the CD-ROM holder 10. This may be desirable for a number of reasons. For example, it may be desirable to conceal the identity of the CD-ROM 16 if, for example, the CD-ROM holder 10 were to be transferred through the mails. Concealing the identity of the CD-ROM 16 may serve to deter theft, etc. Additionally, it may be desirable to print advertising indicia in the form of words, graphics and/or opaque areas on one or both surfaces of the CD-ROM holder 10 in order to attract a potential user's attention and to give the potential user information about the identity of the contents stored on CD-ROM 16 and the desirability of its use.

Figure 4:
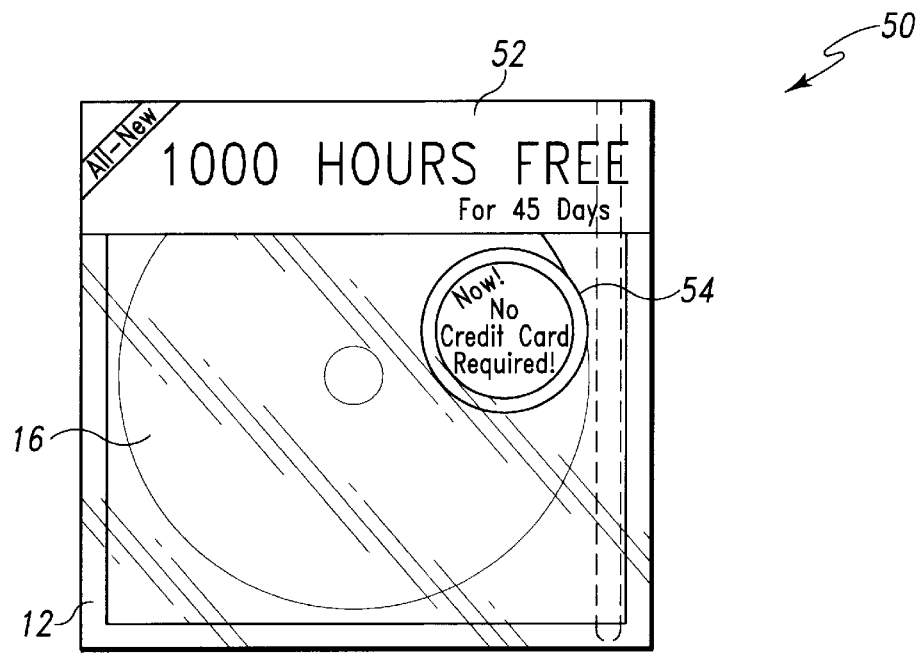
FIG. 4 is a top plan view of a second embodiment of the present invention.
Figure 5:
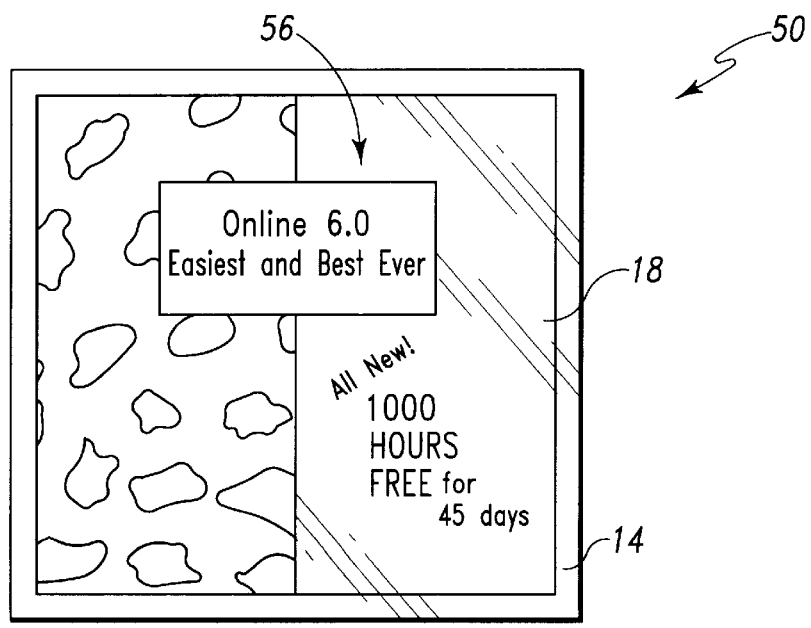
FIG. 5 is a bottom plan view of the second embodiment of the present invention.

The second embodiment of the present invention illustrated in FIGS. 4 and 5, and indicated generally at 50, provides indicia on at least one of the surfaces of the top sheet 12 and/or bottom sheet 14. Such indicia may comprise text, graphics, pictures, logos and/or opaque areas. For example, the CD-ROM holder 50 illustrated in FIG. 4 includes an opaque area 52 formed across the top portion of the CD-ROM holder 50 and including text written thereon. The CD-ROM holder 50 additionally includes a circular opaque region 54 with text written thereon. The remainder of the top sheet 12 illustrated in FIG. 4 is clear. Not only do the areas 52 and 54 provide information to the potential user of the CD-ROM 16, but it is believed that the partial obscuring of the potential user's view of the CD-ROM 16 by the areas 52 and 54 serve to attract the potential user's interest in the CD-ROM 16 and therefore increase the odds that the potential user will open the CD-ROM holder 15 in order to access the software and/or data contained on the CD-ROM 16.

FIG. 5 illustrates the rear view of the CD-ROM holder 50, in which one side of the backer card 18 is visible through the clear bottom sheet 14. The backer card 18 has formed thereon various indicia, such as text, graphics, pictures, logos and/or opaque areas. In this embodiment, the backer card 18 serves an additional function besides a stiffening member for the CD-ROM holder 50. Because the backer card is placed on the side of the CD-ROM 16 from which data is read and which contains no information discernable to the human eye, the backer card can be used to place messages to the potential user that are visible through the clear surface of the bottom sheet 14. FIG. 5 therefore illustrates various indicia 56 printed upon the surface of the backer card 18 and showing through the transparent surface of the bottom sheet 14. As with the indicia 52 and 54, the indicia 56 served to heighten interest in the potential user for the CD-ROM 16.

As can be seen from the above-description, the CD-ROM holder of the present invention exhibits several desirable characteristics. First, because it is constructed of heat sealed vinyl and/or cardboard or other stiff material, it is relatively inexpensive. Because the vinyl and cardboard each have relatively small thicknesses, the CD-ROM holder of the present invention is also not much thicker than the CD-ROM itself, which provides significant benefits in terms of handling, storage and, particularly, mailing costs. The CD-ROM holder of the present invention also includes a novel zipper arrangement which protects the CD-ROM prior to use, but which also allows easy access to the interior of the holder. Finally, the present invention also includes indicia which may be placed on the vinyl surfaces or on the backer card in order to provide information to a potential user of the CD-ROM or to excite interest in the CD-ROM from the potential user. It is therefore believed that the CD-ROM holder of the present invention represents a significant improvement over prior art devices.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed:

1. A CD-ROM holder, comprising:
   a first sheet of heat-sealable material;
   a second sheet of heat-sealable material;
   a CD-ROM placed between the first and second sheets of heat-sealable material;
   a backer card placed between the CD-ROM and the second sheet of heat-sealable material;
   a seal extending substantially around a periphery of the first and second sheets of heat-sealable material, wherein the seal fuses the first and second sheets together and forms a pocket containing the CD-ROM and the backer card;
   a zipper formed in one of the first and second sheets of heat-sealable material, the zipper comprising:
      a first perforated line extending from a first end to a second end along one edge of the first and second sheets;
      a second perforated line extending from a third end to a fourth end substantially the length of the first perforated line and spaced therefrom, wherein the first and third ends are adjacent and the second and fourth ends are adjacent;
      a semi-circular perforation extending substantially from the second end to the fourth end; and
   indicia printed on at least one of the first and second sheets.

\* \* \* \* \*